United States Patent [19]

Furukawa

[11] Patent Number: 5,051,735
[45] Date of Patent: Sep. 24, 1991

[54] HEADS-UP DISPLAY SYSTEM FOR A ROAD VEHICLE

[75] Inventor: Yoshimi Furukawa, Saitama, Japan

[73] Assignee: Honda Giken Kogyo Kabushiki Kaisha, Tokyo, Japan

[21] Appl. No.: 248,881

[22] Filed: Sep. 23, 1988

[30] Foreign Application Priority Data

Sep. 25, 1987 [JP] Japan .................... 62-240110

[51] Int. Cl.⁵ .............................. G09G 3/02
[52] U.S. Cl. ............................ 340/705; 340/905; 340/980; 358/103; 353/13; 364/444; 359/630
[58] Field of Search ............... 340/705, 980, 905; 358/93, 103, 104, 250; 350/174; 353/13, 14; 364/444, 449, 443; 434/69, 62

[56] References Cited

U.S. PATENT DOCUMENTS

| | | | |
|---|---|---|---|
| 4,077,138 | 3/1978 | Foerst | 434/69 |
| 4,182,053 | 6/1980 | Allen et al. | 434/69 |
| 4,716,458 | 12/1987 | Heitzman et al. | 358/103 |
| 4,774,672 | 9/1988 | Tsunoda et al. | 340/995 |
| 4,808,978 | 2/1989 | Vernay | 340/705 |
| 4,886,328 | 12/1989 | Iino | 340/705 |

FOREIGN PATENT DOCUMENTS

| | | | |
|---|---|---|---|
| 2819761 | 11/1987 | Fed. Rep. of Germany | 340/980 |
| 1605011 | 12/1981 | United Kingdom | 340/980 |
| 217612 | 3/1987 | United Kingdom | 340/705 |

Primary Examiner—Ulysses Weldon
Assistant Examiner—M. Fatahiyar
Attorney, Agent, or Firm—Skjerven, Morrill, MacPherson, Franklin & Friel

[57] ABSTRACT

A heads-up display system for a road vehicle, comprising sensors for detecting the motion related parameters of the vehicle, computer for predicting the motion of the vehicle, and a heads-up display for displaying information within the view of the driver of the vehicle. The computer converts the predicted motion of the vehicle into an image display on the heads-up display so as to permit the driver to see the image display in a certain relationship with his view as he looks ahead of the vehicle. Thus, the driver can gain useful information on the motion of the vehicle such as limit turning trajectories and braking distances so that he can operate the vehicle more easily and more sensibly than was possible heretofore. The heads-up display preferably comprises a projector for projecting an image display on the windshield of the vehicle.

11 Claims, 7 Drawing Sheets

HEADS-UP DISPLAY SYSTEM FOR A ROAD VEHICLE

TECHNICAL FIELD

The present invention relates to a display system for notifying the motion-related information on the vehicle to the driver and enabling him to drive the vehicle more easily and safely by predicting the motion of the vehicle and superimposing the motion trajectory of the vehicle on the view seen ahead of the vehicle.

BACKGROUND OF THE INVENTION

How one can drive a vehicle depends heavily on his experience and expertise. If he is not well experienced or makes inappropriate decisions, he may run into problems, for instance by entering a curve at excessively high speed and being obliged to take a sudden braking action, by misjudging the distance required for the vehicle to come to a complete stop and, again, being obliged to take a sudden braking action, and so forth.

BRIEF SUMMARY OF THE INVENTION

In view of such problems with conventional vehicles, a primary object of the present invention is to provide a display system for a vehicle which predicts the motion of the vehicle and notifies it to the driver so as to enable him to drive the vehicle more sensibly and properly.

Further, a second object of the present invention is to provided such a display system which would not produce any parallax and is capable of making accurate displays irrespective of the attitude of the vehicle.

According to the present invention, such objects can be accomplished by providing a heads-up display system for a road vehicle, comprising: a sensor for detecting motion-related information on said vehicle; computing means for predicting the motion of said vehicle according to said motion related information detected by said sensor; display means for displaying information within the view of the driver of said vehicle; and conversion means for converting said predicted motion of said vehicle into an image display on said display means so as to permit the driver to see said image display in a certain relationship with his view of the outside of said vehicle.

Thus, since by superimposing the predicted motion of the vehicle on the view which is seen by the driver ahead of the vehicle, he can obtain appropriate information while simply looking ahead and occupying himself with the driving, he can operate the vehicle more easily and more sensibly.

According to a preferred embodiment of the present invention, the display means comprises a projector which projects the image display upon a windshield of the vehicle or an at least semi-transparent passive screen placed in front of the driver. Alternatively, an at least semi-transparent active display panel may be placed in front of the driver as the display means.

According to a certain aspect of the present invention, the image display on the display means comprises a limit turning trajectory which gives rise to a certain limit lateral acceleration when the vehicle has moved along the trajectory at the current speed of the vehicle and, optionally, the predicted course of the vehicle in relation with the turning trajectory. If desired, the image display on the display means comprises a plurality of turning trajectories which give rise to a certain set of lateral acceleration values when the vehicle has moved along the trajectories at the current speed of the vehicle. A numerical display may be made adjacent to each trajectory for indicating the magnitude of the lateral acceleration associated with the corresponding trajectory.

Since cornering maneuver of a vehicle is highly important in terms of the safety of the vehicle, the display of such cornering trajectories offers a highly useful aid to the driver of the vehicle. Alternatively or additionally, the braking distance of the vehicle, which depends on the vehicle speed and the road surface conditions, may be displayed on the heads-up display.

In predicting the motion of the vehicle, it is meaningful to take the side slip angle of the vehicle into account. And, to eliminate the parallax due to the change in the attitude of the vehicle body, it is desirable to account for the pitch and roll angles of the vehicle.

BRIEF DESCRIPTION OF THE DRAWINGS

Now the preferred embodiments of the present invention are described in the following with reference to the appended drawings, in which.

DETAILED DESCRIPTION OF THE PREFERRED EMBODIMENTS

Figure 1:
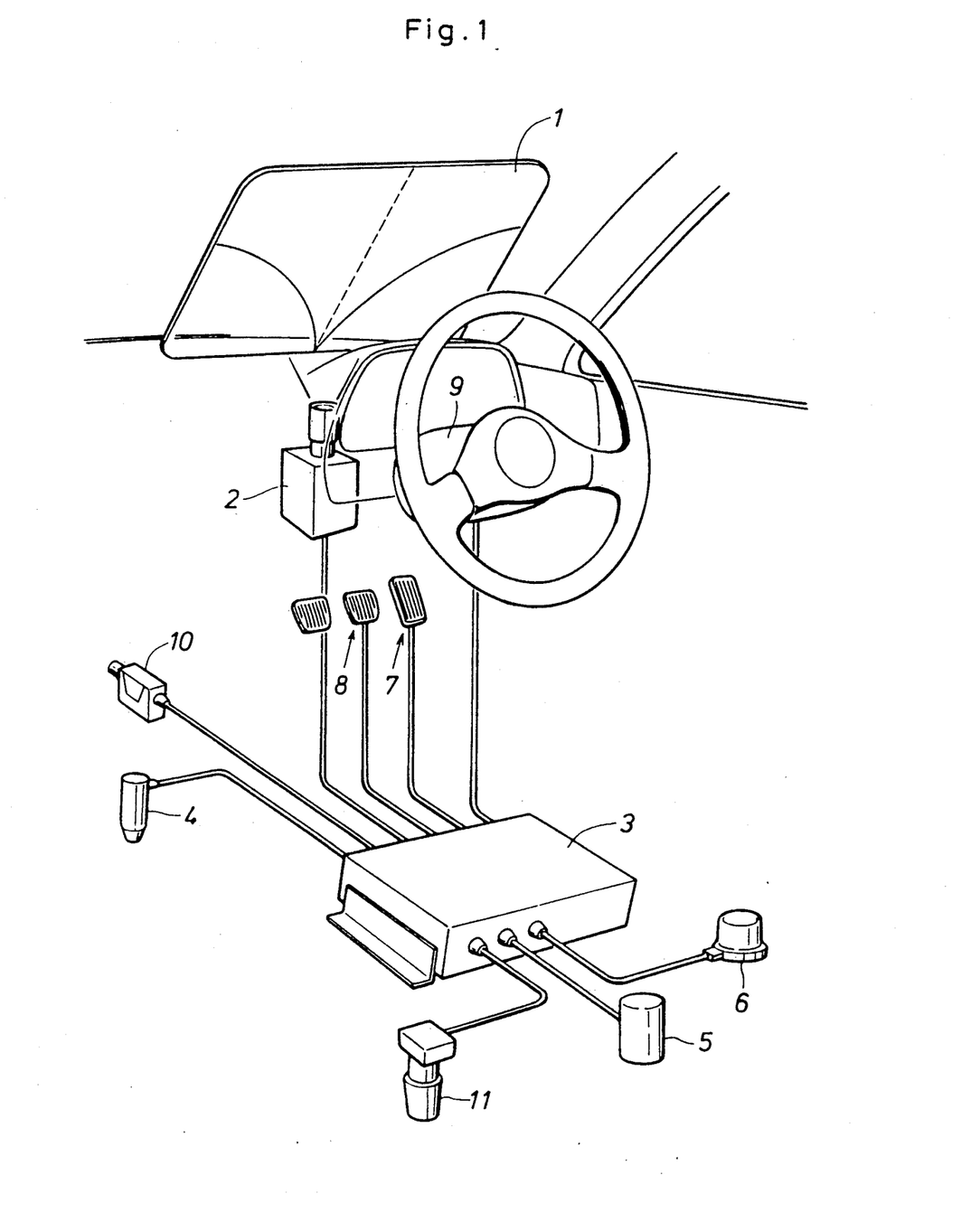
FIG. 1 is a system structural view of the display system according to the present invention.

FIG. 1 shows the fundamental structure of the display system according to the present invention. A projector 2 placed in the instrument panel so as to face upwards projects an image upon a screen 1 for a heads-up display arrangement placed in front of the driver's seat. Alternatively, the screen 1 may consist of a liquid crystal display panel which is substantially transparent so that the driver can look through it. The configuration of this image is determined as a result of the computational process in a computer 3 based upon the information on the motion of the vehicle as detected by a vehicle speed sensor 4. In this embodiment, only one such vehicle speed sensor is used, but the accuracy of vehicle speed estimation can be improved by strategic use of the outputs from a plurality of such speed vehicle sensors.

The accuracy of the image projected upon the screen 1 can be improved by detecting the yaw rate, the roll rate, the roll angle, the pitch rate, the pitch angle, the brake pedal pressure, the brake fluid pressure, the foreand-aft acceleration, the throttle pedal stroke, the throttle opening angle, the steer angle, the drive torque, or a combination of these data with a rate gyro 5, an acceleration meter 6, a throttle pedal sensor 7, a brake pedal sensor 8, a steer angle sensor 9, a road friction coefficient sensor 10, a side slip angle sensor 11, or a combination thereof, and performing an appropriate correctional computation with the computer 3. In particular, by detecting the friction coefficient of the road surface by the use of the road friction coefficient sensor 10, as a lateral acceleration of the vehicle body with respect to the road surface, an even more accurate display of the motion of the vehicle is made possible.

The specific basic action of the preferred embodiment of the vehicle display system according to the present invention is described in the following with reference to FIGS. 2 through 4.

For instance, when the vehicle is turning along a circle having a radius R at a speed V, the centripetal acceleration a of the vehicle at that moment, is given by the following.

$$a = V^2/R \tag{1}$$

In other words, when the vehicle is steered at speed V so as to achieve a turning maneuver of radius R, the lateral acceleration a given by Equation (1) is produced. The maximum value $a_{max}$ which this lateral acceleration a can take is determined by the upper limit of the frictional force between the tires and the road surface. If the coefficient of friction between the tires and the road surface is $\mu$, the permissible range of the lateral acceleration a is given by the following equation.

$$a < a_{max} \leq \mu \tag{2}$$

Thus, as a approaches $\mu$, the cornering powers of the front and rear wheels are reduced, and the yaw rate gain diminishes.

Therefore, when the vehicle begins a turning maneuver along a corner having radius R at the present vehicle speed of V, the driver should control the vehicle speed V according to the predicted margin of the lateral acceleration a over the limit of the lateral acceleration $a_{max}$ which is given by the friction coefficient of the road surface $\mu$. But, in reality, the driver determines the vehicle speed as he begins a turning maneuver according to his experience and intuition without having access to any definite guideline.

On the other hand, according to the present embodiment, the reference turning trajectory, giving the limit turning trajectory or the trajectory of the limit of the curve which the vehicle can safely turn, possibly with a certain safety margin, is projected ahead of the driver, and the driver can compare the projected image with the actual configuration of the road ahead. Therefore, the driver can evaluate the margin of the expected turning trajectory of the vehicle over the limit turning trajectory or the reference turning trajectory, and can make a sensible judgment on the appropriateness of the current vehicle speed.

Specifically, by detecting the vehicle speed with the vehicle speed sensor 4 and displaying the limit turning trajectory which produces a certain reference lateral acceleration (reference lateral acceleration or limit lateral acceleration) on either side of the front view of the driver by means of the heads-up display system, the driver can compare the range covered by the limit turning trajectory with the configuration of the road ahead, and can accurately judge the margin of the current vehicle speed over the reference (limit) vehicle speed which corresponds to the reference lateral acceleration.

Now the algorithm for deriving the image to be projected is described in the following.

A turning radius R is computed from a predetermined reference lateral acceleration $a_s$ and the vehicle speed V detected at the current time point according to the following formula.

$$R = V^2/a_s \tag{3}$$

Figure 2:
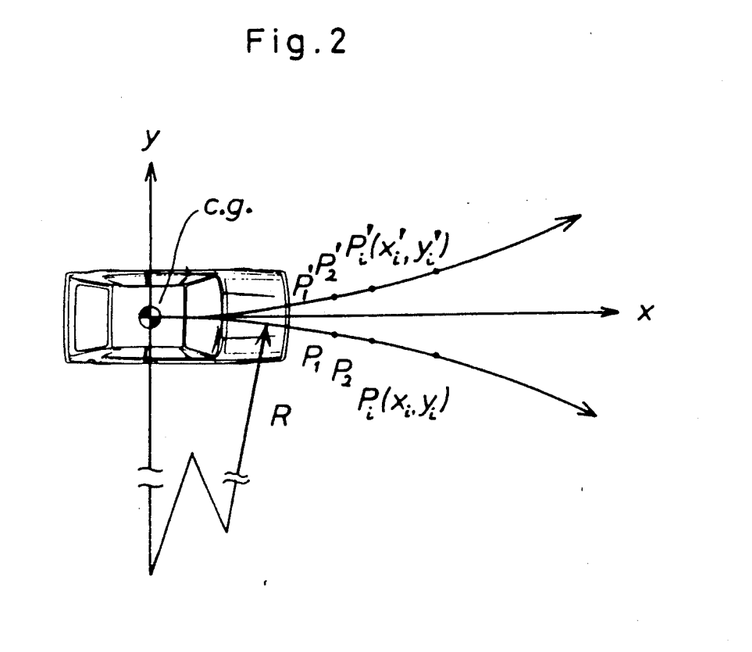
FIG. 2 is a diagram showing the trajectories of the vehicle on the road surface.
Figure 3:
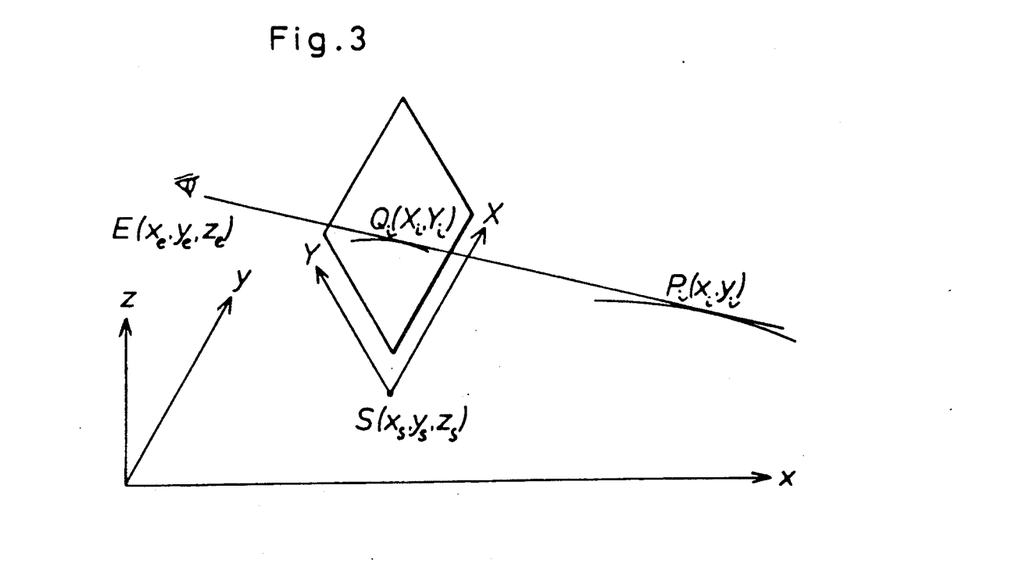
FIG. 3 is a diagram showing the relationship between a point $P_i$ on the road surface and a corresponding point $Q_1$ on the screen.

The limit trajectories $P_i$ and $P_i'$ of the vehicle when it proceeds at the present vehicle speed are given by the two circles given in the following if the central longitudinal line of the vehicle body is placed along the x-axis of an x-y coordinate system having its origin at the center of gravity (c.g.) of the vehicle body at this time point as shown in FIG. 2.

$$x^2 + (y-R)^2 = R^2 \tag{4}$$

$$x^2 + (y+R)^2 = R^2 \tag{5}$$

Then, from the group of (x, y) values which satisfy Equations (4) and (5), a series of coordinates of the points $P_i$ and $P_i'$ can be obtained by incrementing the value of x as given in the following.

$$\begin{aligned}&P_1(x_1, y_1), P_2(x_2, y_2), \ldots, \\ &P_i(x_i, y_i), \ldots, P_n(x_n, y_n), \text{ and} \\ &P_1'(x_1', y_1'), P_2'(x_2', y_2'), \ldots, \\ &P_i'(x_i', y_i'), \ldots, P_n'(x_n', y_n')\end{aligned} \tag{6}$$

Now, the points on the screen 1 which correspond to this series of points with respect to the eye position E of the driver are computed through a three-dimensional geometric process, and the coordinates of such a series of points $Q_i$ and $Q_i'$ in an X-Y coordinate system fixed to the screen can be derived as follows according to a certain conversion formula.

$$\begin{aligned}&Q_1(X_1, Y_1), Q_2(X_2, Y_2), \ldots, \\ &Q_i(X_i, Y_i), \ldots, Q_n(X_n, Y_n), \text{ and} \\ &Q_1'(X_1', Y_1'), Q_2'(X_2', Y_2'), \ldots, \\ &Q_i'(X_i', Y_i'), \ldots, Q_n'(X_n', Y_n')\end{aligned} \tag{7}$$

The computation based on this conversion formula can be uniquely and simply executed, according to a geometric principle, as a process of finding the points of intersection $Q_i$ between the lines $EP_i$ and the X-Y plane fixed to the screen since the coordinate $(x_s, y_s, z_s)$ of the origin S of the X-Y coordinate system fixed to the screen 1 and the coordinate $(x_e, y_e, z_e)$ of the eye position E of the driver are known.

Figure 4:
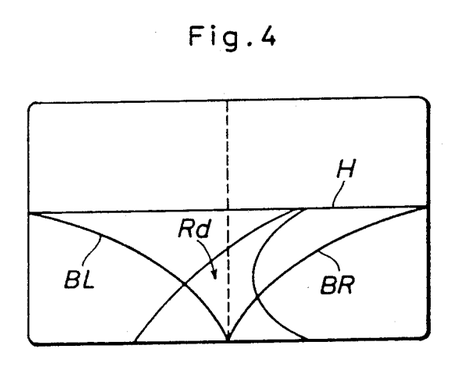
FIG. 4 shows basic display contents on the screen.

Thus, as shown in FIG. 4, the range of the vehicle trajectory in which the vehicle can turn at the current vehicle speed in either direction without exceeding the limit lateral acceleration can be projected upon the screen 1 of the heads-up display system. In FIG. 4, BL and BR denote the turning trajectories of the vehicle which give rise to the reference lateral acceleration, and since the road ahead Rd is located between these trajectories BL and BR, one can see that the vehicle can maintain the present course and speed without exceeding the reference lateral acceleration. The displayed limit trajectories change depending on the vehicle speed, and, generally speaking, as the vehicle speed increases, the region between the right and left trajectories BL and BR becomes narrower. The line H denotes a horizon seen ahead of the vehicle.

Figure 5:
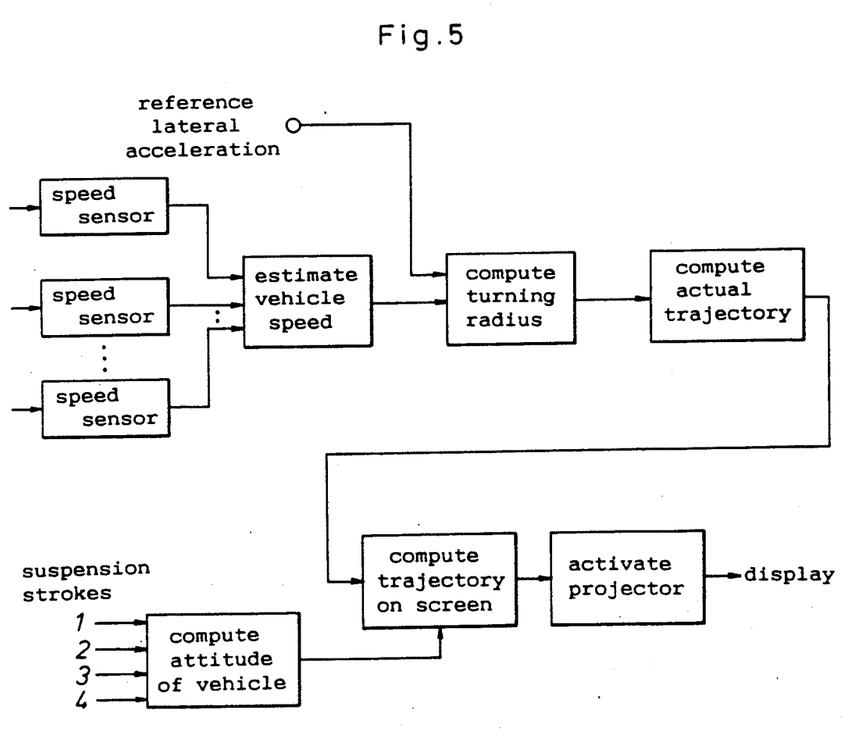
FIG. 5 is a flow chart showing the functional flow of the display system according to the present invention.

FIG. 5 shows a flow diagram which summarizes the process of such computation; the vehicle speed is estimated from the data obtained from the vehicle speed sensors, and the reference turning radius which gives rise to a predetermined reference lateral acceleration is derived from the reference lateral acceleration which is determined in advance for each particular vehicle and the estimated vehicle speed. Now, the series of points along the trajectory on the road surface as given by this turning radius are computed and are converted into the coordinates of the points along the trajectories on the screen of the display system. At the same time, the inclination angle of the vehicle body is detected according to the strokes of the suspension systems, the output from a level meter or the output from a gyro, and the resulting parallax is corrected by an appropriate process when the predicted trajectory of the vehicle which gives rise to the reference lateral acceleration is displayed on the screen.

Figure 6:
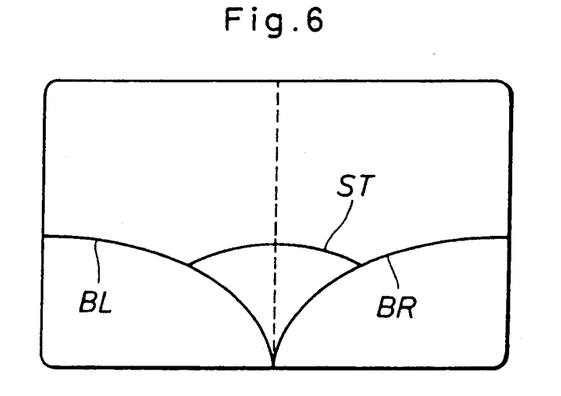
FIGS. 6 through 11 show different display contents for showing various kinds of information.

In the above described embodiment, the range of the trajectory of the vehicle in which the vehicle can safely turn was displayed on the heads-up display system according to the vehicle speed and the reference lateral acceleration, but it is also possible to display the braking distance which is predicted from the current vehicle speed, on the screen. FIG. 6 shows such a display in which the range of safe braking distances is indicated by an arcuate line ST extending laterally between the limit trajectories BL and BR corresponding to the reference lateral acceleration so that the driver can accurately judge the braking distance. As a matter of course, as the vehicle speed increases, the position of the line ST moves upwards on the screen. In this case, to the end of improving the accuracy of the prediction, the braking distance may be computed by accounting for not only the vehicle speed but also the data obtained from the road surface friction coefficient sensor 10.

Figure 7:
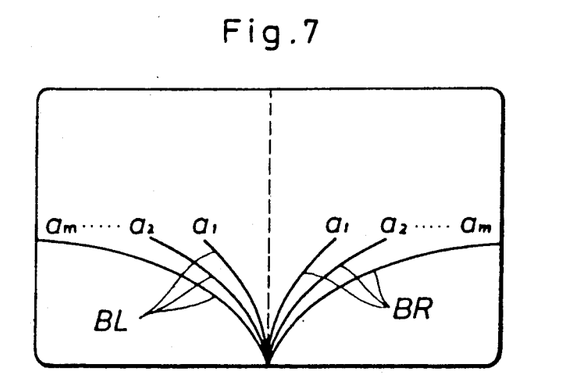

In the above described embodiment, only one value (limit lateral acceleration) was given as the reference lateral acceleration, but it is also possible to give a plurality of values of the limit lateral acceleration $a_1$ through $a_m$ and display all the limit turning trajectories corresponding to these reference lateral acceleration values. FIG. 7 shows such a display, and the value of each reference lateral acceleration may be numerically displayed in association with each of the limit trajectories. Moreover, according to this embodiment, it is also possible to predict the magnitude of the acceleration which will be produced if the vehicle turns the oncoming curve at the current vehicle speed.

In such a system, the reference acceleration value, such as 0.4G, 0.6G and so on, may be fixed to each particular vehicle, or, alternatively, may be made manually adjustable, for instance, over the range from 0.1 to 0.9G. In this case also, the limit lateral acceleration of the vehicle can be more accurately determined by making use of the output of the friction coefficient sensor 10, and the selection of the reference lateral acceleration may be made in an even more sensible manner.

When the friction coefficient of the road surface cannot be measured directly, it can be indirectly estimated from the relationships existing between the vehicle response and the input steer angle of the steering wheel, the steering torque, the yaw rate of the vehicle, the lateral acceleration, the side slip angle and so on. Likewise, it is possible to estimate the change in the friction coefficient of the road surface from the relationship between the brake pedal pressure and the current vehicle speed.

Figure 8:
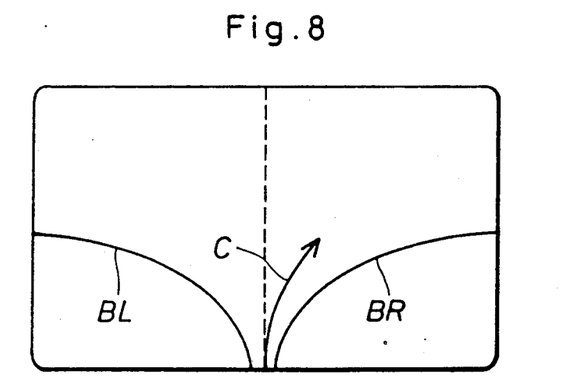

FIG. 8 shows the display of the expected or predicted trajectory C of the vehicle when the present motion is continued in addition to the limit turning trajectories BL and BR corresponding to the reference lateral acceleration. The contents of the display are determined by estimating the turning trajectory from the current lateral acceleration $a_0$ according to the following formula.

$$R = V^2/a_0 \qquad (8)$$

And, if the yaw rate r and the side slip angle change rate $\dot{\beta}$ are detected, the turning radius R can be estimated from the following formula.

$$R = (r + \dot{\beta})/V \qquad (9)$$

Since $\dot{\beta}$ is generally small, it can be approximated by $$R = r/V \qquad (10)$$

By displaying the predicted trajectory of the vehicle not only as a predicted steady state response of the vehicle based on the dynamic state variables of the vehicle such as the yaw rate and the lateral acceleration but also as a dynamic response which accounts for the steering operation which the driver performs from time to time, the precision of the estimation can be improved even further. In such a case, the prediction of the course of the vehicle can be conveniently performed with the aid of a mathematical response model which considers the yaw rate, the lateral acceleration, and the side slip angle.

Figure 9:
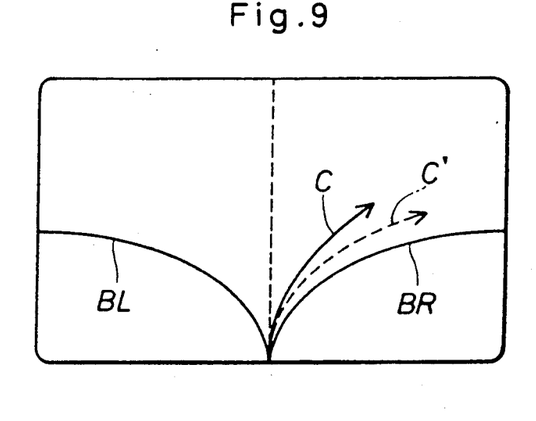

FIG. 9 shows a display in which the transient response of the vehicle to the steering action performed by the driver is considered in predicting the course C' as opposed to the case when only the steady state response of the vehicle is considered in predicting the course C of the vehicle. By displaying C' alone or both C and C', the driver can predict the behavior of the vehicle, in particular how it is affected by the steering maneuver.

Figure 10:
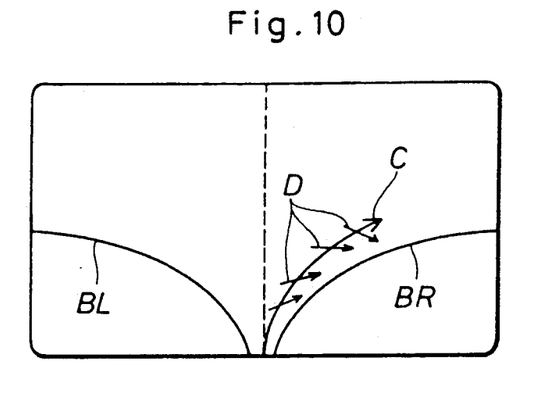

FIG. 10 shows not only the predicted course of the vehicle but also the predicted attitude angle (in particular the roll angle) at each time point by the corresponding inclined lateral line D.

In order to improve the accuracy of the computation of the turning trajectories, various compensation or correction processes may be performed. For instance, the steady state lateral acceleration of the vehicle is not produced immediately after the steering wheel is turned, and the response of the vehicle therefore involves a certain time delay. Also, the steering operation by the driver involves a certain time delay before the steer angle reaches a value which gives rise to a certain reference lateral acceleration. Therefore, the accuracy of the prediction of the trajectory of the vehicle can be improved even further by taking into account the effect of such time delays in computing the predicted trajectory of the vehicle.

Figure 11:
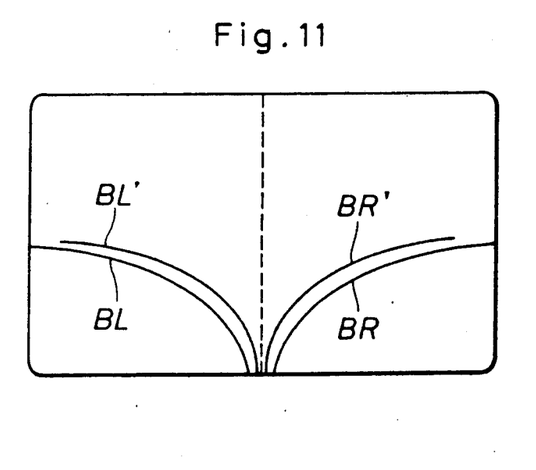

FIG. 11 shows limit trajectories BL' and BR' which are based on such considerations. In reality, a mathematical model is constructed for predicting the response property of the vehicle against steering operation, and its behavior is computed as required.

When the vehicle accelerates or decelerates during cornering, the cornering behavior of the vehicle is affected by the change in the loading distribution of the front and rear wheels, the change in the toe angle due to the changes in the strokes of the suspension systems, the reduction in the lateral force of the tires due to the traction or braking force acting upon them and so on. Therefore, by detecting the fore-and-aft acceleration, the brake pedal pressure, the throttle pedal stroke, the throttle opening and so on, and correcting the predicted turning trajectories according to the values of these parameters, a highly accurate prediction of the motion of the vehicle is possible.

Figure 12:
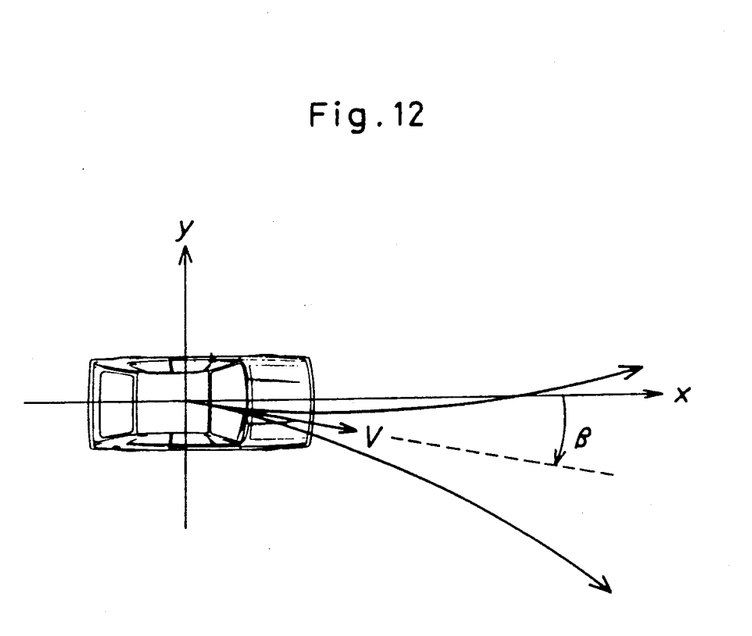
FIG. 12 is a diagram showing the influence of the side slip angle of the vehicle during cornering on the trajectory of the vehicle on the road surface.
Figure 13:
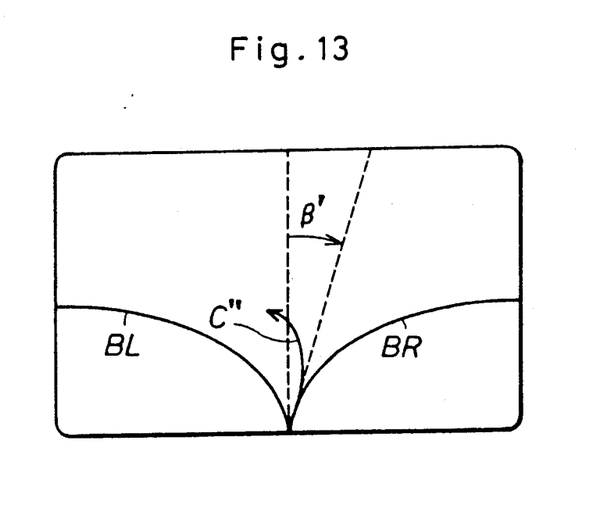
FIG. 13 shows display contents which take into account the side slip angle of the vehicle.

Since the side slip angle of the vehicle causes a relatively significant influence upon the behavior of the vehicle, the estimation of the limit trajectory can be substantially improved in accuracy by taking this factor into account. Specifically, the fore-and-aft direction of the vehicle during cornering does not necessarily coincides with the direction of the motion of the vehicle, and the vehicle advances at a certain angle (side slip angle $\beta$) relative to the central longitudinal line of the vehicle as shown in FIG. 12. The angle $\beta$ changes according to the vehicle speed, the steering input angle of the steering wheel, and the condition of the road surface. Therefore, since the expected trajectory of the vehicle as seen from the driver also deviates from the central longitudinal line of the vehicle by this side slip angle $\beta$, it is desirable to take this deviation into account and accordingly correct the trajectory on the heads-up display system as shown in FIG. 13. The side slip angle of the vehicle $\beta$ can be detected with the side slip angle sensor 11 or can be estimated from the following relationship of the side slip angle $\beta$ with respect to the lateral acceleration a and the yaw rate R.

$$a = V(r + \dot{\beta}) \tag{11}$$

Hence, $$\beta = \int_0^t (a/V - r)dt + \beta_0 \tag{12}$$

where $\beta_0$ is the initial value of $\beta$ at $t=0$.

By computing the deviation $\beta'$ on the screen with a computer by using the estimated value of the side slip angle $\beta$, the display contents as shown in FIG. 13 are obtained. The predicted course of the vehicle is also indicated by a curve C''.

Figure 14:
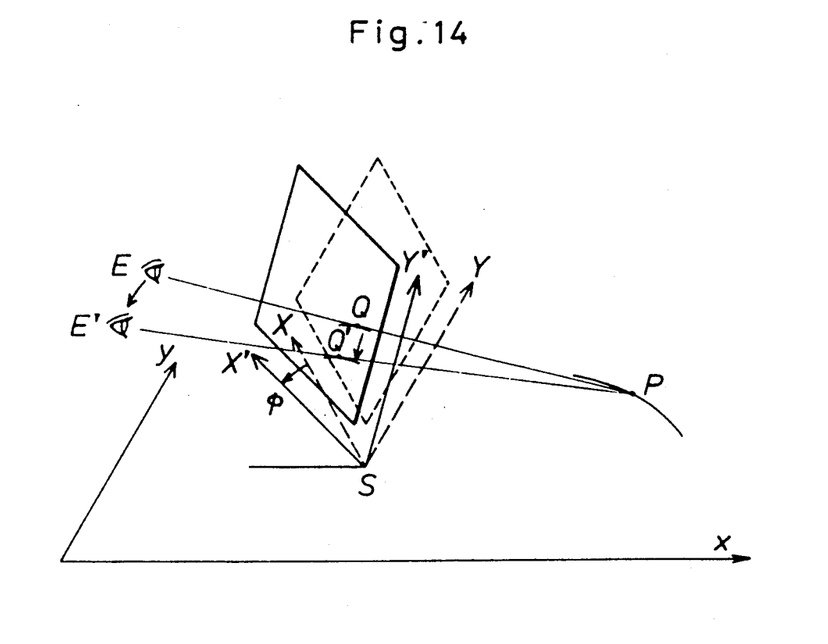
FIG. 14 is a diagram showing the change in the display positions on the screen according to the change in the attitude of the vehicle.

When the vehicle rolls by an angle $\phi$ during cornering, the heads-up display system likewise inclines as shown in FIG. 14, and the relative eye position of the driver moves accordingly from E to E'. In an actual rolling motion, the sprung vehicle body rolls about a roll center axis which does not necessarily passes through the origin of the coordinate system fixed to the heads-up display system. However, in this drawing, the origin S is made to agree with the roll center for the convenience of description.

Figure 15:
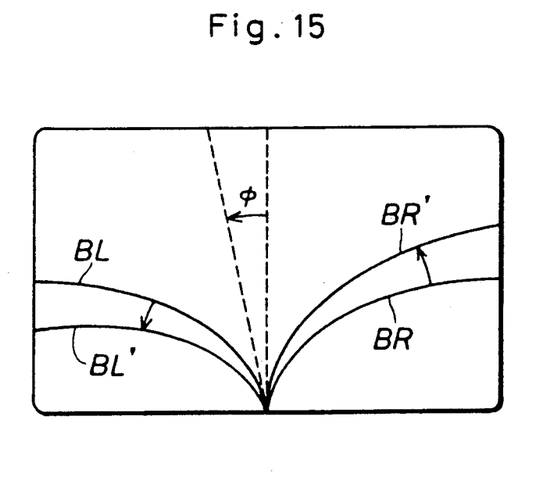
FIG. 15 shows how the image deviations on the screen due to the change in the attitude of the vehicle can be corrected.

As a result of the rolling motion of the vehicle body, the point on the display system corresponding to an identical point on the trajectory of the vehicle moves from the point Q to the point Q'. Therefore, the display on the heads-up display system should be corrected by taking the roll angle $\phi$ into account as shown in FIG. 15.

It is obvious from the above discussion that a similar correction of the display contents is possible to account for the influences of the change in the pitch angle of the vehicle body.

The roll angle may be detected by using a gyro, but as a simplified method for detecting the roll angle, it is possible to estimate the roll angle by detecting the suspension strokes of a right and left wheels and dividing the difference by the tread or the distance between the right and left wheels.

Although the estimation of the roll angle from the suspension strokes is possible by using either the two front wheels or the two rear wheels, the estimation accuracy can be improved by detecting the suspension strokes of the four front and rear wheels and averaging them. Further, by detecting the suspension strokes of the four wheels individually, the pitch angle of the vehicle body can be additionally estimated, and the display can be corrected by taking into account the pitch angle as well.

The above embodiments generally pertained to the information on the movement trajectory of the vehicle, but the display contents may further include the rotational speed of the engine, the vehicle speed, the time, the bearing, various alarm displays and so on, by graphic and/or numerical representation. For improved recognition of the display contents, some of them may be displayed in various colors.

According to the present invention, since the driver can obtain appropriate information while he occupies himself with driving and simply looks ahead, he can easily and sensibly operate the vehicle irrespective of his expertise in driving.

Although the present invention has been shown and described with reference to the preferred embodiments thereof, it should not be considered as limited thereby. Various possible modifications and alterations could be conceived of by one skilled in the art to any particular embodiment, without departing from the spirit of the present invention.

What we claim is:

1. A heads-up display system for a road vehicle, comprising:
    a sensor for detecting motion-related information on the vehicle while the vehicle is being driven along a road;
    computing means for predicting the future course of motion of the vehicle according to the motion-related information detected by said sensor and parameters associated with the vehicle;
    display means for displaying the information within the normal road view of a driver of the vehicle, the information including a limit turning trajectory which gives rise to a certain limit lateral acceleration when the vehicle moved along the limit turning trajectory at a current speed of the vehicle; and
    conversion means for converting the predicted motion of the vehicle into an image display on said display means so as to permit the driver to see said image display in a certain relationship with his view of the actual road ahead of said vehicle.

2. A heads-up display system for a road vehicle as defined in claim 1, wherein said display means comprises a projector which projects said image display upon a windshield of the vehicle or upon an at least semitransparent passive screen placed in front of the driver.

3. A heads-up display system for a road vehicle as defined in claim 1, wherein said display means comprises an at least semi-transparent active display panel placed in front of the driver.

4. A heads-up display system for a road vehicle as defined in claim 1, wherein said image display on said display means further comprises the predicted course of the vehicle in relation with the limit turning trajectory.

5. A heads-up display system for a road vehicle as defined in claim 1, wherein said image display on said display means comprises a plurality of turning trajectories which give rise to a certain set of lateral acceleration values when the vehicle has moved along said trajectories at the current speed of the vehicle.

6. A heads-up display system for a road vehicle as defined in claim 5, wherein said image display on said display means further comprises the predicted course of the vehicle in relation with said turning trajectories.

7. A heads-up display system for a road vehicle as defined in claim 1, wherein said computing means predicts said motion of the vehicle by taking the side slip angle of the wheels of the vehicle into account.

8. A heads-up display system for a road vehicle as defined in claim 1, further comprises means for detecting the attitude of the vehicle, and said conversion means accounts for said attitude of the vehicle detected by said detecting means.

9. A heads-up display system for a road vehicle as defined in claim 1, wherein said image display on said display means comprises a braking distance which the vehicle must travel before it comes to a complete stop as a result of a braking operation at a then current vehicle speed.

10. A heads-up display system for a road vehicle as defined in claim 1, wherein said computing means includes means for computing the actual trajectory of the vehicle.

11. A heads-up display system for a road vehicle as defined in claim 1, in which said limit turning trajectory information on said image display is in the form of cusp-like curved diverging lines extending from a central longitudinal line for the vehicle from the center of gravity of the vehicle.

* * * * *